3,770,716
2,4 - DISUBSTITUTED-5-IMINO-4,5-DIHYDRO-1,2,4-TRIAZOLIUM-3-YL AZO ANILINE OR NAPHTHYLAMINE DYESTUFFS

Minoru Ozutsumi, Kyokuji Arakawa, Masao Yamamoto, and Osamu Narukawa, Tokyo, Japan, assignors to Hodogaya Chemical Co., Ltd., Tokyo, Japan
No Drawing. Filed Jan. 19, 1971, Ser. No. 107,854
Claims priority, application Japan, Feb. 2, 1970, 45/8,450
Int. Cl. C09b 29/00, 43/00
U.S. Cl. 260—146 R                    8 Claims

ABSTRACT OF THE DISCLOSURE

Basic monoazo dyestuffs, corresponding to the formula:

$$[D\text{—}N\text{=}N\text{—}E]^{\oplus}X^{\ominus}$$

in which D is a 2,4-disubstituted-5-imino-4,5-dihydro-1,2,4-triazolium-3-yl radical, E is a residue of an aniline or naphthylamine coupling component and X is an anion, are particularly valuable for the coloration of acrylic, modacrylic and acid modified polyester textile materials. The disclosed compounds give red to violet dyeings having improved fastness to light on such textile materials.

DESCRIPTION OF THE INVENTION

The present invention relates to novel basic monoazo dyestuffs, which are particularly valuable for the coloration of acrylic, modacrylic and acid modified textile materials.

The novel dyestuffs of the invention are free from sulphonic acid and carboxylic acid groups and have the general formula:

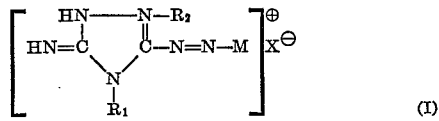

(I)

wherein $R_1$ and $R_2$ are the same or different and each represents lower alkyl, e.g., alkyl having up to about 4 carbon atoms, such as, for example, methyl, ethyl, propyl, isopropyl, butyl, isobutyl, etc., or benzyl; M represents a radical having the formula:

wherein: A represents a phenylene or naphthylene radical each derived from an aniline and a naphthylamine coupling component, e.g., 1,4-phenylene, 1,4-naphthylene, or 1,4-phenylene and 1,4-naphthylene substituted with halogen, lower alkyl, lower alkoxy or acylamino, such as, for example, methyl-1,4-phenylene, ethyl-1,4-phenylene, chloro-1,4-phenylene, methoxy-1,4-phenylene, ethoxy-1,4-phenylene, acetylamino-1,4-phenylene, benzoylamino-1,4-phenylene, dimethyl-1,4 - phenylene, dichloro-1,4-phenylene, dimethoxy-1,4-phenylene, or methyl-methoxy-1,4-phenylene, etc., $R_3$ represents hydrogen, lower alkyl, e.g., alkyl having up to about 4 carbon atoms, such as, for example, methyl, ethyl, propyl, isopropyl, butyl, isobutyl, etc., or lower alkyl substituted with halogen, hydroxy, cyano, lower alkoxy, phenoxy, or phenyl, such as haloalkyl, e.g., β-chloroethyl, β-bromethyl; hydroxyalkyl, e.g., β-hydroxyethyl, β-hydroxypropyl; cyanoalkyl, e.g., β-cyanoethl; lower alkoxalkyl, e.g., β-methoxyethyl, β-ethoxyethyl; β-phenoxyethyl, benzyl, and γ-chloro-β-hydroxypropyl, etc., and $R_4$ represents lower alkyl, e.g., alkyl having up to about 4 carbon atoms, such as, for example, methyl, ethyl, propyl, isopropyl, butyl, isobutyl, etc., lower alkyl substituted with halogen, hydroxy, cyano, lower alkoxy, phenoxy, or phenyl, such as haloalkyl, e.g., β-chloroethyl, β-bromoethyl; hydroxyalkyl, e.g., β-hydroxyethyl, β-hydroxypropyl; cyanoalkyl, e.g., β-cyanoethyl; lower alkoxyalkyl, e.g., β-methoxyethyl, β-ethoxyethyl; β-phenoxyethyl, benzyl and γ-chloro-β-hydroxypropyl, etc., phenyl, or phenyl substituted wtih lower alkyl, e.g., methyl; or lower alkoxy, e.g., methoxy, ethoxy, etc., or $R_3$ and $R_4$ together with the nitrogen atom form a heterocyclic ring, e.g., piperidino, morpholino, and piperazino, or M represents a radical, e.g., 1,2-dimethylindoline-5-yl, 3-hydroxy-1,2,3,4-tetrahydroquinoline - 6 - yl, and 1-1-methyl-3-hydroxy-7',8'-benzo - 1,2,3,4 - tetrahydromethyl-3-hydroxy-1,2,3,4-tetrahydroquinoline-6-yl, and 1 - methyl - 3 - hydroxy-7',8' - benzo-1,2,3,4-tetrahydroquinoline-6-yl, and X represents an anion.

The dyestuffs of the invention having the Formula 1 can be prepared by alkylating and quaternizing an azo compound having the general formula:

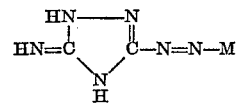

(2)

(wherein the definition of M is as defined above) with an alkylating agent. In said reaction, not only quaternization occurs but also simultaneously, alkylation of the triazoline ring occurs. Accordingly, the azo compound having the Formula 2 is converted to the dyestuffs of the present invention by alkylation and quaternization. Said alkylation is accelerated by adding a basic compound, such as magnesium oxide, magnesium carbonate, sodium acetate, calcium hydroxide, calcium carbonate, sodium bicarbonate, sodium carbonate and zinc oxide. Suitable alkylating agents include the alkyl esters of inorganic acids or organic sulfonic acids, alkyl halides and aralkyl halides, such as dimethyl sulfate, diethyl sulfate, dipropyl sulfate, dibutyl sulfate, methyl p-toluene sulfonate, ethyl p-toluene sulfonate, n-propyl p-toluene sulfonate, n-butyl p-toluene sulfonate, ethyl bromide, ethyl chloride, methyl iodide, ethyl iodide, n-butyl iodide, benzyl chloride, benzyl bromide and the like. In accordance with this invention, in some cases, it is advantageous to carry out the reaction of the compound of Formula 2 with an excess amount of alkylating agent.

The reaction of the invention can be performed in an organic solvent, such as benzene, toluene, xylene, chlorobenzene, dichlorobenzene, nitrobenzene, chloroform, carbon tetrachloride, tetrachloroethane, acetone, dimethylformamide, tetrahydrofuran, N-methylpyrrolidone, methanol, ethanol, glycol and glycol alkyl-ether. In general, the solvent used for this reaction is selected depending upon the solubility of the azo compound which will be quaternized and upon the reactivity of said alkylating agent. When an alkylating agent having a high reactivity, such as an alkyl sulfate, e.g., dimethyl sulfate or benzyl halide, is used, the reaction can be carried out in water in the presence of a suitable basic compound.

If desired, it is also possible to carry out alkylation and quaternization in two steps. In this case, the first alkylation is carried out by treating the azo compound with an alkylating agent in an aqueous medium in the presence of suitable basic compounds, such as sodium hydroxide or sodium carbonate, so as to substitute an alkyl radical, represented by $R_1$, or $R_2$ in the aforementioned Formula 1 for the hydrogen of the imino radical on the triazoline ring. The resulting compound is then quaternized with an alkylating agent.

When using the two step reaction, a dyestuff having the Formula 1 wherein $R_1$ and $R_2$ are different, can be obtained. The reaction according to the present process with an alkylating agent may be carried out at room temperature or at elevated temperatures. The amount of alkylating agent used should be greater than 2 moles per mole of azo compound. In order to smoothly complete the reaction, however, an excess quantity of the alkylating agent may preferably be employed.

The dyestuffs thus obtained are readily separated from the reaction mixture when the precipitation of the dyestuffs is found in an organic solvent and thereafter filter separating. The solvent can also be removed by distillation, such as vacuum or steam distillation. If water-miscible solvents are used, they may be diluted with water and then salted out to separate the dyestuff in an aqueous solution. If desired, or required, the resulting dyestuff may be purified by recrystallization from water or a suitable solvent. It is especially advantageous to purify the dyestuffs by dissolution in water. The unreacted raw materials can be filtered off as an insoluble residue and the dyestuff can be precipitated from the filtrate by adding a water soluble salt, e.g., sodium chloride or sodium sulfate.

The dyestuffs obtained according to the process of the present invention corresponding to Formula 1, contains an anion $X^\ominus$ which is the residue of a strong acid, e.g., the residue of sulfuric acid or of a semi-ester thereof, the residue of an arylsulfonic acid or of a hydrohalogenic acid. The anions introduced into the dyestuff molecule by quaternizing the azo compound may be substituted with anions of other acids such as phosphoric acid, formic acid, acetic acid, chloroacetic acid, oxalic acid, lactic acid or tartaric acid. The dyestuffs can also be used in the form of double salts such as with halides of sulfates of metals of Group II of the Periodic Table, especially zinc chloride or zinc sulfate.

The mono-azo compounds having the Formula 2 used as starting material in the invention can be prepared from guanazole (3,5-diimino-1,2,4-triazolidine or 3,5-diamino-1,2,4-triazole) and a coupling component of aniline type or naphthylamine type. However, said monoazo compounds cannot be produced by conventional diazo-coupling methods. When guanazole is reacted with an acid and a nitrite or nitrosyl sulfuric acid as the conventional diazotizing method, tetrazotization is predominant so that the resulting coupling compounds are obtained as a mixture of disazo compound and monoazo compound. Accordingly, those conventional methods cannot be used in industrial processes for producing the monoazo compound.

It has been disclosed in the prior art, R. Stolle und W. Dietrich, Journal für Praktische Chemie, 139, 193–210 (1934), that it is difficult to produce a diazonium salt having no tetrazonium salt by directly diazotizing a guanazole. A mixture of 3,5-bis(4-hydroxypenylazo)-1,2,4-triazole and 3-amino-5-(4-hydroxyphenyl azo)-1,2,4-triazole is obtained by reacting guanazole with sodium nitrite in concentrated HCl, and coupling the resultant compound with phenol. Also, it has been disclosed that a diazonium salt can be produced by reacting guanazole in alcohol with amyl nitrite and then treating the resultant 3-amino-5-nitrosoamino-1,2,4-triazole with concentrated HCl.

Also in the prior art, R. Stolle und R. Krauch, Journal für Praktische Chemie, (2) 88, 311 (1913), it has been disclosed that 3-amino-5-nitrosoamino-1,2,4-triazole can be obtained by treating guanazole with sodium nitrite in diluted aqueous acetic acid.

We have now found that the monoazo compounds having the Formula 2 can be prepared in high yields by treating 3-amino-5-nitrosoamino-1,2,4-triazole obtained by reacting guanazole with sodium nitrite in an aqueous solution of an organic acid, especially dilute acetic acid, with a coupling component in an aqueous solution of an organic acid, especially formic acid. The coupling reaction is facilitated by being carried out in a stronger acid than acetic acid; however, disazo compound will result if an inorganic acid is used such as hydrochloric acid or sulfuric acid. Accordingly, it is preferable to carry out the reaction in an organic acid such as formic acid, oxalic acid, monochloroacetic acid or dichloroacetic acid, or in a mixture of an organic acid and an inorganic acid.

The suitable coupling components include:

N,N-dimethylaniline
N,N-diethylaniline
N,N-dimethyl-m-toluidine
N,N-diethyl-m-toluidine
N,N-diethyl-m-chloroaniline
N,N-diethyl-m-anisidine
N,N-diethyl-m-phenetidine
N,N-dibutylaniline
N-ethyl-o-chloroaniline
N-β-cyanoethyl-o-toluidine
N-methyl-N-β-chloroethylaniline
N-ethyl-N-β-chloroethyl-m-toluidine
N-ethyl-N-β-cyanoethylaniline
N-ethyl-N-β-cyanoethyl-m-toluidine
N-β-cyanoethyl-N-benzylaniline
N-β-hydroxyethyl-N-benzylaniline
N-ethyl-N-benzylaniline
N,N-dibenzylaniline
N-ethyl-N-benzyl-m-toluidine
N,N-di-β-cyanoethylaniline
N,N-di-β-chloroethyl-m-toluidine
N-ethyl-N-β-hydroxypropylaniline
N-butyl-N-β-ethoxyethylaniline
N-ethyl-N-β-methoxyethyl-m-toluidine
N-methyl-N-β-phenoxyethylaniline
N,N-diethyl-m-acetamidoaniline
N-methyldiphenylamine
N-methyl-4-ethoxydiphenylamine
N-phenylpiperidine
N-phenylmorpholine
N-phenylpiperazine
N-methylnaphthylamine
N-ethylnaphthylamine
N,N-dimethylnaphthylamine
N,N-diethylnaphthylamine
1,2-dimethylindoline
3-hydroxy-1,2,3,4-tetrahydroquinoline
1-methyl-3-hydroxy-1,2,3,4-tetrahydroxyquinoline
1-methyl-3-hydroxy-7′,8′-benzo-1,2,3,4-tetrahydroquinoline and the like.

Since the monoazo compound used as starting material may be in the form either as shown in Formula 2, or in its tautomeric form:

$$\begin{array}{c}HN\text{---}N\\|\phantom{xxx}\|\\HN\!=\!C\phantom{xx}C\!-\!N\!=\!N\!-\!M\\\diagdown\!\!N\!\!\diagup\\|\\H\end{array}\rightleftarrows$$

$$\begin{array}{c}N\text{---}N\\\|\phantom{xxx}\|\\H_2N\!-\!C\phantom{xx}C\!-\!N\!=\!N\!-\!M\\\diagdown\!\!N\!\!\diagup\\|\\H\end{array}\rightleftarrows\begin{array}{c}HN\text{---}NH\\|\phantom{xxx}\|\\HN\!=\!C\phantom{xx}C\!-\!N\!=\!N\!-\!M\\\diagdown\!\!N\!\!\diagup\end{array}\rightleftarrows$$

$$\begin{array}{c}N\text{---}NH\\\|\phantom{xxx}|\\H_2N\!-\!C\phantom{xx}C\!-\!N\!=\!N\!-\!M\\\diagdown\!\!N\!\!\diagup\end{array}\rightleftarrows\begin{array}{c}HN\text{---}N\\|\phantom{xxx}\|\\H_2N\!-\!C\phantom{xx}C\!-\!N\!=\!N\!-\!M\\\diagdown\!\!N\!\!\diagup\end{array}$$

(wherein the definition of M is as defined above), it is difficult to indicate which nitrogen atom on the triazole ring is alkylated or quaternized in said alkylation and quaternization reactions.

It should be understood that the Formula 1 represents one of the tautomeric and electromeric forms as follows:

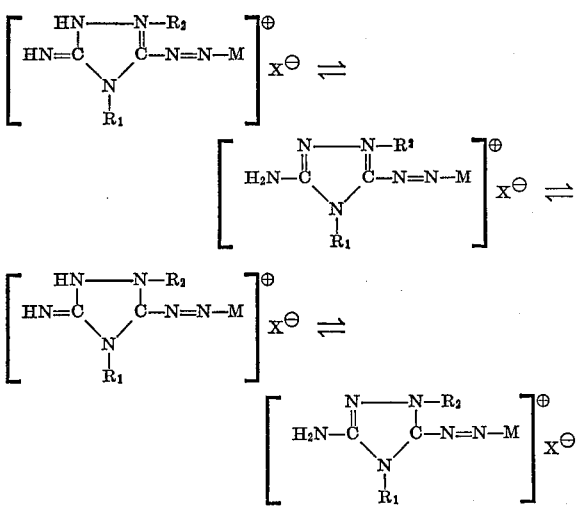

In British Pat. 1,117,734, Belgian Pat. 675,821, Netherland Pat. 6600940, and Japanese patent publication 15,303/1968, certain similar processes have been disclosed. However, the monoazo compound used in this invention have not been stated and it is impossible to produce the present monoazo compound by said process.

No industrially practical process for producing these compounds have been found prior to the present invention.

The novel cationic dystuffs of the invention are suitable for the dyeing or printing of mordanted cellulosic fibers, silk, leather, paper, acetate and synthetic fibers, such as modified nylon and polyesters having acidic groups, polyacrylonitrile, and copolymers thereof.

When these fibers are dyed or printed with the present dyestuffs, the dyeings provide very clear and deep shades and exhibit good fastness to light, to wetting and to heating.

Having generally described the invention, a better understanding can now be obtained by reference to certain specific examples which are provided herein for the purposes of illustration only and are not meant to be limiting in any manner.

All parts and percentages are intended to refer to parts by weight and percentages by weight, unless otherwise specified.

Example 1

3.2 parts of the monoazo compound having the formula:

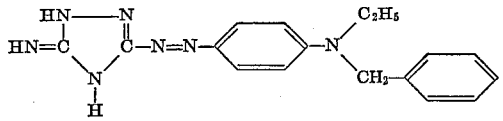

was added to 10 parts of water and the mixture was thoroughly stirred. 0.8 part of zinc oxide and 6.3 parts of dimethyl sulfate were added to the mixture and the batch was then stirred at room temperature (25°–30° C.) for 10 hours. The resultant mixture was added to 130 parts of water while stirring, and was heated at 70° C. to form a solution after which the solution was cooled to the room temperature. 17 parts of sodium chloride was added for salting out and the precipitated crude dyestuff was filtered. The crude dyestuff was dissolved in 150 parts of water. 0.7 part of active carbon was added and mixed at 40°–50° C. for 30 minutes.

The insoluble matters were filtered and the filtrate was cooled to room temperature. 20 parts of sodium chloride was added for salting out and the precipitated dyestuff was filtered and then dried at 50° C. in vacuum, to yield 5.4 parts of dye salt whose formula is believed to be as follows:

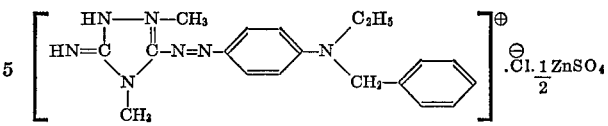

The dye salt was soluble in water with a red color. Polyacrylonitrile fibers were dyed with said dye salt from a weak acidic dye bath in bright red shades having excellent fastness to light and to wetting.

The monoazo compound having said formula used as the starting material was prepared as follows:

5.6 parts of mononitroso compound which was prepared by reacting guanozel (3,5-diamino-1,2,4-triazol) with sodium nitrite in dilute acetic acid, was mixed with 40 parts of water at room temperature (25°–26° C.) while stirring.

A solution of 6.2 parts of N-ethyl-N-benzylaniline in 11 parts of 90% formic acid was added to said mixture and was mixed at room temperature for 24 hours. The resultant solution was poured into 400 parts of water and the precipitated monoazo compound was filtered and washed with water. After drying the precipitate at 50° C. in vacuum, 8.6 parts of red shade powder having a melting point of 245°–250° C. (decomposition) was obtained. The powder was recrystallized from a mixture of dimethylformamide and methanol to yield a reddish-brown color plate crystal having a melting point of 276°–280° C. (decomposition).

The mononitroso compound which is filtered can also be used for said process in wet form. When a mixture of 4.6 parts of 90% formic acid and 0.3 parts of 35% hydrochloric acid was used instead of the formic acid in said process, the same monoazo compound was obtained in a similar yield.

Example 2

2.5 parts of monoazo compound having the formula:

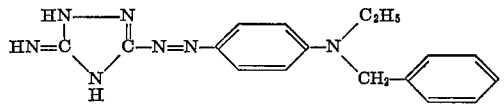

was dissolved in 12.5 parts of dimethylformamide. 4.91 parts of dimethyl sulfate and 0.37 part of magnesium oxide were added while stirring and reaction was effected at 100°–110° C. for 4 hours. The resultant solution was cooled and fed in 200 parts of water and then 1 part of 35.6% hydrochloric acid was added to the mixture and stirred at 60° C. for 1 hour. The insoluble materials were filtered and 8 parts of 1 N-zinc chloride solution and 35 parts of sodium chloride were added to the filtrate for salting out of the dye salt.

The precipitated dye salt was filtered and dried at 50° C. in vacuum to yield 3.3 parts of a dye salt whose formula is considered as follows:

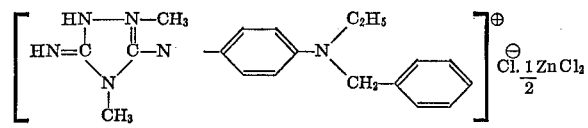

The dye salt was soluble in water and found to have a reddish color. Polyacrylonitrile fibers were dyed with said dye salt from a weak acidic dye bath in bright red shades having excellent fastness to light and to wetting.

When diethyl sulfate or ethyl p-toluene sulfonate was used instead of dimethyl sulfate in this process, an ethylated dye corresponding to the above dye salt was obtained.

When a similar process to Example 2 was repeated by using the following starting materials, dyestuffs having similar dyeing properties were obtained.

The shades described in the following table are produced on polyacrylonitrile fibers.

| Example | Coupling component | Quaternizing agent | Shade on polyacrylonitrile fiber |
|---|---|---|---|
| 3 | N-ethyl-N-β-cyanoethyl aniline | Diethylsulfate | Red. |
| 4 | N-methyl-N-β-chloroethyl aniline | ....do | Red. |
| 5 | N-β-cyanoethyl-o-chloro aniline | Dimethylsulfate | Yellowish-red. |
| 6 | N,N-dibutylaniline | ....do | Bluish-red. |
| 7 | N-β-hydroxyethyl-N-benzylaniline | Ethyl p-toluene sulfonate | Red. |
| 8 | N-ethyl-N-β-hydroxypropylaniline | ....do | Bluish-red. |
| 9 | N-ethyl-N-β-methoxyethyl-m-toluidine | Dimethylsulfate | Do. |
| 10 | N-ethyl-N-benzyl-m-toluidine | ....do | Do. |
| 11 | N-methyl-N-β-phenoxyethylaniline | ....do | Do. |
| 12 | N,N-diethyl-m-acetoamide aniline | ....do | Violet. |
| 13 | N-methyl-diphenylamine | ....do | Reddish-violet. |
| 14 | N-methyl-4-ethoxydiphenylamine | ....do | Violet. |
| 15 | N,N-diethyl-m-chloroaniline | ....do | Red. |
| 16 | N,N-diethyl-m-anisidine | Diethylsulfate | Bluish-red. |
| 17 | N-phenyl piperidine | Butyl p-toluene sulfonate | Red. |
| 18 | N-phenylmorphorine | Ethyl-p-toluene sulfonate | Red. |
| 19 | N-methyl-2-methylindoline | Dimethylsulfate | Red. |
| 20 | N-methyl-3-hydroxy-7',8'-benzo-1,2,3,4-tetra-hydroquinoline | ....do | Bluish-red. |
| 21 | N-methyl naphthylamine | ....do | Reddish-violet. |
| 22 | N,N-dimethyl naphthylamine | ....do | Do. |

Example 23

3.8 parts of monoazo compound having the formula:

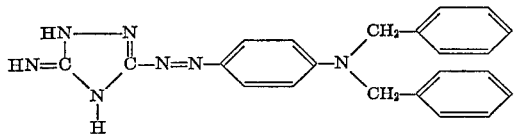

was added in 20 parts of water while stirring 1.5 parts of calcium hydroxide and 7.7 parts of diethylsulfate were added and the reaction occurred at room temperature for 1.5 hours. The resultant solution was poured into 200 parts of water, heated at 70° C. for 30 minutes, and then cooled. 20 parts of sodium chloride was added to the resultant solution for salting out and the crude dye salt was obtained by filtering.

A solution of the crude dye salt dissolved in 150 parts of water was heated to 80° C. while stirring, and then 1 part of active carbon was added. The insoluble materials were filtered and 8 parts of 1 N-zinc chloride and 20 parts of sodium chloride were added to the filtrate for salting out. The precipitated dye salt was filtered and dried at 50° C. in vacuum, to yield 4.2 parts of dye salt whose formula is believed to be:

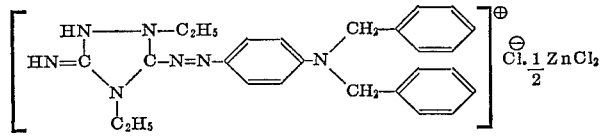

The dye salt was soluble in water and had a reddish color. Polyacrylonitrile fibers were dyed with said dye salt from a weak acidic dye bath in bright red shades having excellent fastness to light and to wetting.

Example 24

2.3 parts of monoazo compound having the formula:

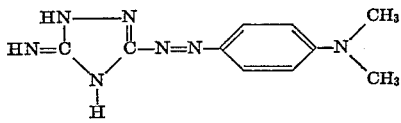

was prepared in a similar manner to that described in Example 1. This compound was dissolved in a mixture of 30 parts of 50% aqueous ethanol and 0.65 part of 85% potassium hydroxide. After 1.3 parts of benzylchloride was added to said solution, the mixture was stirred under reflux for 3 hours.

The resultant solution was cooled and the precipitated dye was filtered. The filtered cake was fed in 100 parts of 40% acetic acid and dissolved by heating at 70°–80° C. After adding 0.5 part of active carbon to the solution, it was hot filtered. The filtrate was fed into 200 parts of aqueous solution containing 43 parts of 93% sodium hydroxide and the mixture was stirred at 50°–60° C. for 1 hour. After the insoluble materials were filtered off, the filtrate was neutralized with acetic acid. The precipitated dye was filtered and dried to yield 2.5 parts of reddish-brown powder of benzylated monoazo compound. 1.6 parts of the resultant benzylated monoazo compound was dissolved in 10 parts of dimethylformamide. 2.5 parts of dimethylsulfate was added to the resultant solution and the mixture was stirred at 30°–90° C. for 5 hours and cooled.

From the resultant solution, dimethyl formamide was distilled off in vacuum and the residue was mixed in 200 parts of water. 30 parts of sodium chloride was added for salting out. The precipitate was filtered and fed into 150 parts of 20% acetic acid to dissolve it at 70°–75° C. After adding 0.5 part of active carbon to the solution, it was hot filtered.

The filtrate was cooled and zinc chloride and sodium chloride were added to the filtrate for salting out. The precipitate was filtered and dried at 50° C. in vacuum to yield 2.2 parts of a red dye salt powder. The dye salt was soluble in water and was found to have a reddish color. Polyacrylonitrile fibers were dyed with said dye salt from a weak acidic dye bath to provide bright red shades having excellent light and wet fastness properties.

Example 25

2.3 parts of monoazo compound shown in the Example 24 were fed into 50 parts of monochlorobenzene together with 0.3 part of magnesium oxide. 7.7 parts of diethylsulfate was added dropwise to the solution at 100°–120° C. for 30 minutes and stirred for 6 hours at the same temperature. After the reaction mixture was cooled to 10° C., the precipitated product was filtered. The resultant crude dye was fed into 200 parts of water and then was refined as shown in the Example 1, to yield 3.1 parts of dye salt whose formula was believed to be:

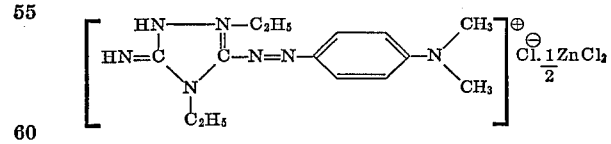

The dye salt was soluble in water and was found to provide a red color. Polyacrylonitrile fibers were dyed with said dye salt from a weak acidic dye bath to provide bluish-red shades having excellent light and wet fastness properties. When 100 parts of chloroform was used instead of monochlorobenzene in the process, the same dye was obtained.

Example 26

3.5 parts of monoazo compound having the formula:

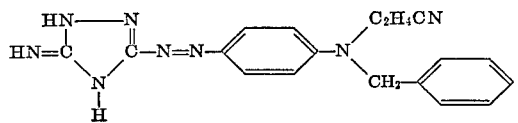

was reacted with 3.0 parts of ethylbromide in 200 parts of ethanol at 100°–120° C. under pressure for 5 hours. The resultant solution was cooled and most of the solvent was distilled off in vacuum. The residue was dissolved in 200 parts of water and then was refined as shown in the Example 1 to yield 4.0 parts of a dye salt whose formula is believed to be as follows:

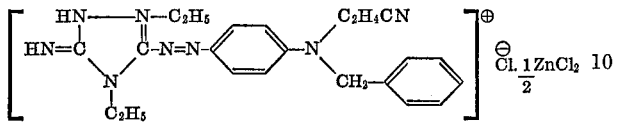

The dye salt was soluble in water and was found to have a reddish color. Polyacrylonitrile fibers were dyed with said dye salt from a weak acidic dye bath to provide yellowish-red shades having excellent light and wet fastness properties.

Having now fully described the invention, it will be apparent to one of ordinary skill in the art that many changes and modifications can be made without departing from the spirit or scope of the invention. Accordingly, what is claimed as new and intended to be secured by Letters Patent of the United States is:

1. A basic azo dyestuff which does not contain sulphonic acid or carboxylic acid groups, having the formula:

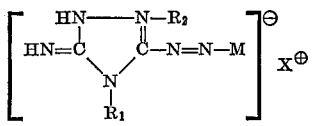

wherein; $R_1$ and $R_2$ are the same or different and each represents lower alkyl or benzyl; M represents a member selected from the group consisting of (1) radicals having the formula:

wherein A represents 1,4-phenylene; 1,4-naphthylene; or 1,4-phenylene or 1,4-napthylene, substituted with chloro or bromo, lower alkyl, lower alkoxy or acetylamino; $R_3$ represents hydrogen; lower alkyl; or lower alkyl substituted with chloro or bromo, hydroxy, cyano, lower alkoxy, phenoxy, or phenyl; $R_4$ represents lower alkyl; lower alkyl substituted with chloro or bromo, hydroxy, cyano, lower alkoxy, phenoxy or phenyl; phenyl, or phenyl substituted with lower alkyl or lower alkoxy; or $R_3$ and $R_4$ together with the nitrogen atom form a heterocyclic ring selected from the group consisting of piperidino, morpholino, and piperazino and (2) M represents a member selected from the group consisting of 1,2-dimethylindoline-5-yl, 3-hydroxy-1,2,3,4-tetrahydroquinoline-6-yl, 1-methyl-3-hydroxy-1,2,3,4-tetrahydroquinoline-6-yl, and 1-methyl-3-hydroxy-7′,8′-benxo-1,2,3,4-tetrahydroquinoline-6-yl, and X represents an anion.

2. The basic azo dyestuff of claim 1 having the formula:

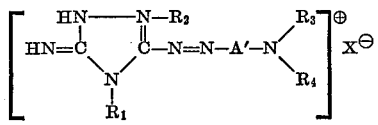

wherein, $R_1$ and $R_2$ are the same or different and each represents lower alkyl or benzyl; A represents 1,4-phenylene; or 1,4-phenylene substituted with chloro or bromo, lower alkyl, lower alkoxy or acetylamino; $R_3$ represents hydrogen; lower alkyl; or lower alkyl substituted with chloro or bromo, hydroxy, cyano, lower alkoxy, phenoxy, or phenyl; $R_4$ represents lower alkyl; lower alkyl substituted with chloro or bromo, hydroxy, cyano, lower alkoxy, phenoxy, or phenyl; phenyl; or phenyl substituted with lower alkyl or lower alkoxy; and X represents an anion.

3. A basic azo dyestuff according to claim 1 having the formula:

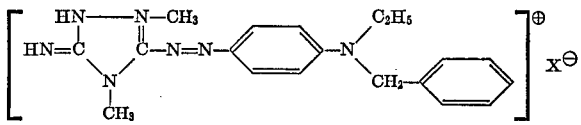

4. A basic azo dyestuff according to claim 1 having the formula:

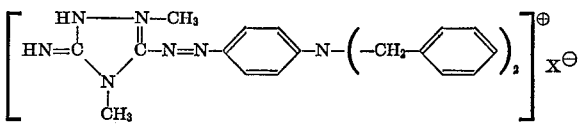

5. A basic azo dyestuff according to claim 1 having the formula:

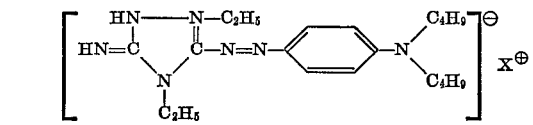

6. A basic azo dyestuff according to claim 1 having the formula:

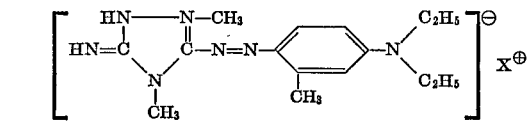

7. A basic azo dyestuff according to claim 1 having the formula:

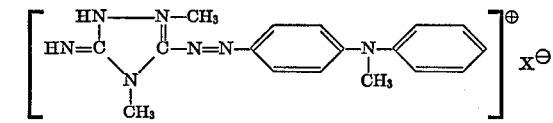

8. A basic azo dyestuff according to claim 1 having the formula:

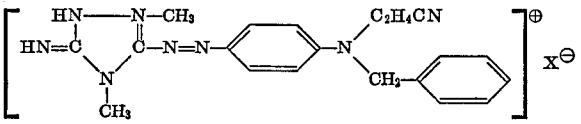

References Cited
UNITED STATES PATENTS

| | | | |
|---|---|---|---|
| 3,438,963 | 4/1969 | Robbins | 260—157 |
| 3,597,412 | 8/1971 | Mohr et al. | 260—146 R |
| 2,883,373 | 4/1959 | Bossard et al. | 260—146 R |
| 3,102,878 | 9/1963 | Baumann et al. | 260—146 R |
| 3,200,108 | 8/1965 | Kremer et al. | 260—157 |
| 3,216,995 | 11/1965 | Baumann et al. | 260—157 |
| 3,257,378 | 6/1966 | Sureau et al. | 260—157 |
| 3,294,777 | 12/1966 | Hansen et al. | 260—157 |
| 3,410,840 | 11/1968 | Baumann et al. | 260—146 R |

FLOYD D. HIGEL, Primary Examiner

U.S. Cl. X.R.

260—155, 156, 157, 208